(12) United States Patent
Chen

(10) Patent No.: US 8,585,063 B2
(45) Date of Patent: Nov. 19, 2013

(54) CHILD CARRIER APPARATUS AND ITS OPERATING METHOD

(75) Inventor: Rui-bin Chen, Central Hong Kong (HK)

(73) Assignee: Wonderland Nurserygoods Company Limited, Hong Kong (HK)

( * ) Notice: Subject to any disclaimer, the term of this patent is extended or adjusted under 35 U.S.C. 154(b) by 278 days.

(21) Appl. No.: 13/090,334

(22) Filed: Apr. 20, 2011

(65) Prior Publication Data
US 2011/0266762 A1 Nov. 3, 2011

(30) Foreign Application Priority Data

Apr. 29, 2010 (CN) .......................... 2010 1 0161796

(51) Int. Cl.
B62B 7/08 (2006.01)

(52) U.S. Cl.
CPC ...................................... B62B 7/08 (2013.01)
USPC ........................ 280/47.38; 280/642; 280/648

(58) Field of Classification Search
CPC ......................................................... B62B 7/08
USPC ...................... 280/33.993, 47.38, 47.41, 639, 280/642–644, 647–650, 658
See application file for complete search history.

(56) References Cited

U.S. PATENT DOCUMENTS

| 4,542,915 | A | * | 9/1985 | Wheeler et al. | 280/642 |
|---|---|---|---|---|---|
| 4,725,071 | A | * | 2/1988 | Shamie | 280/643 |
| 4,858,947 | A | * | 8/1989 | Yee et al. | 280/643 |
| 5,018,754 | A | * | 5/1991 | Cheng | 280/47.4 |
| 5,167,425 | A | * | 12/1992 | Chen | 280/648 |
| 5,333,893 | A | * | 8/1994 | Chen | 280/642 |
| 5,338,096 | A | * | 8/1994 | Huang | 297/243 |
| 5,417,449 | A | * | 5/1995 | Shamie | 280/642 |
| D375,706 | S | * | 11/1996 | Haung | D12/129 |
| 5,664,795 | A | * | 9/1997 | Haung | 280/47.38 |
| 5,722,682 | A | * | 3/1998 | Wang | 280/642 |
| 5,911,432 | A | * | 6/1999 | Song | 280/643 |
| 6,086,087 | A | * | 7/2000 | Yang | 280/658 |
| 6,267,406 | B1 | * | 7/2001 | Huang | 280/647 |
| 6,378,892 | B1 | * | 4/2002 | Hsia | 280/650 |
| 6,530,591 | B2 | * | 3/2003 | Huang | 280/650 |
| 6,843,498 | B2 | * | 1/2005 | Bretschger et al. | 280/642 |
| 7,445,229 | B2 | * | 11/2008 | Dotsey et al. | 280/642 |
| 7,658,446 | B2 | * | 2/2010 | Meeker et al. | 297/250.1 |

(Continued)

FOREIGN PATENT DOCUMENTS

| CN | 102030026 A | 4/2011 |
|---|---|---|
| EP | 2179908 A2 | 4/2010 |
| GB | 2474334 A | 4/2011 |
| GB | 2477035 A | 7/2011 |

Primary Examiner — John R Olszewski
Assistant Examiner — Jacob Meyer
(74) Attorney, Agent, or Firm — David I. Roche; Baker & McKenzie LLP

(57) ABSTRACT

A child carrier apparatus comprises a support frame, a backrest assembly having a backrest frame, a seat assembly mounted with the support frame, wherein the seat assembly includes a first seat frame and a second seat frame, the second seat frame being operable to rotate about a pivot axle relative to the first seat frame, and a hinge structure connected between the backrest frame and the first seat frame. The hinge structure blocks rotation of the backrest frame when the second seat frame is deployed for use, and access to the second seat frame is disabled when the child carrier apparatus is in a configuration using the first seat frame for seating a child. In some embodiments, a method of operating the child carrier apparatus is also described.

20 Claims, 13 Drawing Sheets

(56) References Cited

U.S. PATENT DOCUMENTS

| | | | |
|---|---|---|---|
| 7,694,996 B2* | 4/2010 | Saville et al. | 280/642 |
| 8,029,014 B2* | 10/2011 | Ahnert et al. | 280/650 |
| 8,186,705 B2* | 5/2012 | Greger et al. | 280/643 |
| 8,366,127 B2* | 2/2013 | Zhong et al. | 280/47.4 |
| 2006/0290107 A1* | 12/2006 | Powers | 280/658 |
| 2007/0001429 A1* | 1/2007 | Maciejczyk | 280/642 |
| 2008/0079293 A1* | 4/2008 | Hedges et al. | 297/216.11 |
| 2009/0039620 A1* | 2/2009 | Ryan et al. | 280/647 |
| 2009/0127827 A1* | 5/2009 | Pike et al. | 280/648 |
| 2010/0078916 A1* | 4/2010 | Chen | 280/648 |
| 2010/0102535 A1* | 4/2010 | Zhong | 280/650 |
| 2010/0109272 A1* | 5/2010 | Ahnert et al. | 280/47.38 |
| 2010/0109292 A1* | 5/2010 | Chen et al. | 280/642 |
| 2010/0237589 A1* | 9/2010 | Haut et al. | 280/642 |
| 2010/0282800 A1* | 11/2010 | Li et al. | 224/409 |
| 2011/0068549 A1* | 3/2011 | Chen | 280/47.38 |
| 2011/0148168 A1* | 6/2011 | Chen | 297/364 |

* cited by examiner

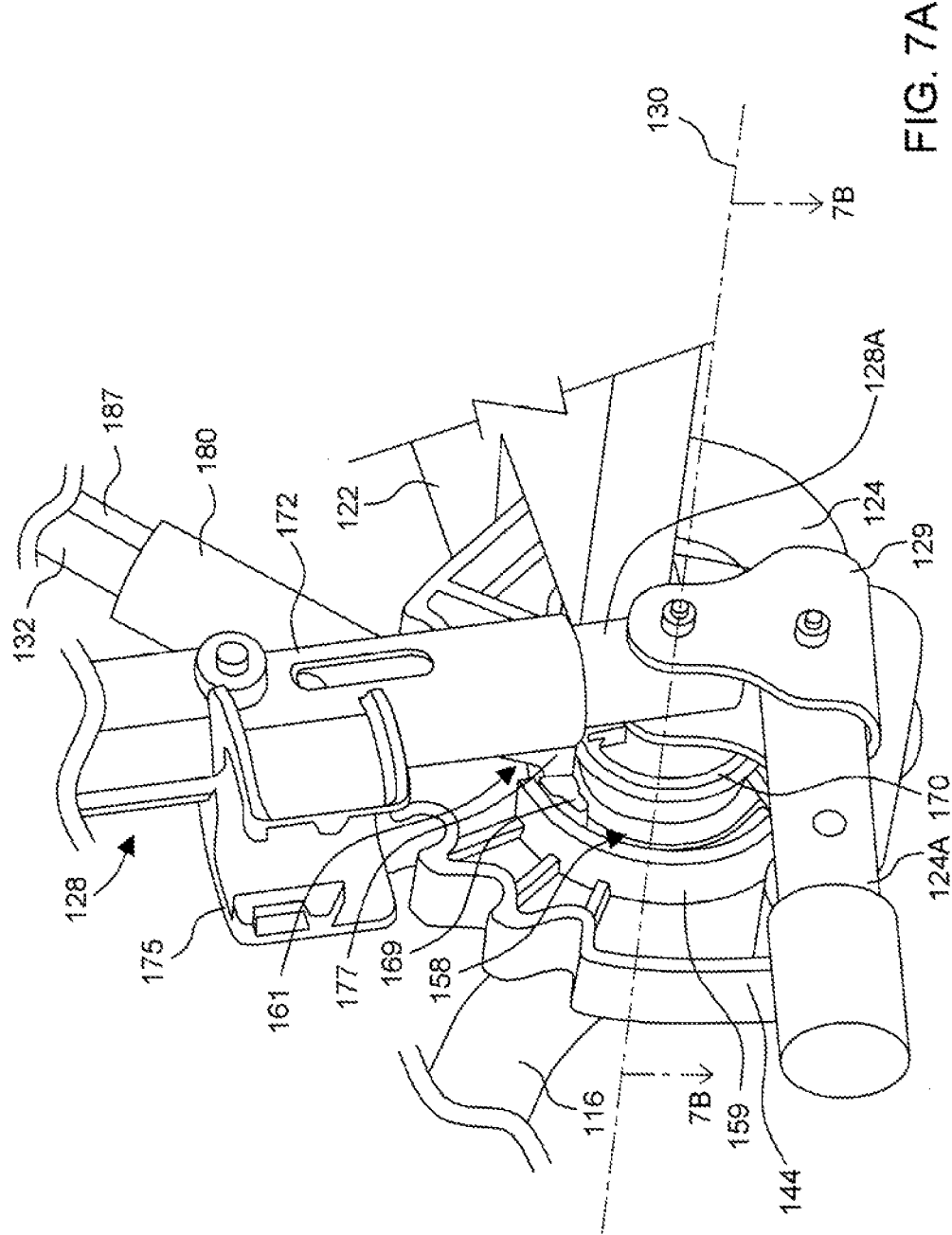

CHILD CARRIER APPARATUS AND ITS OPERATING METHOD

CROSS-REFERENCE TO RELATED APPLICATION

This application claims priority to Chinese Patent Application No. 201010161796.0, which was filed on Apr. 29, 2010.

BACKGROUND OF THE INVENTION

1. Field of the Invention

The present invention relates to a child carrier apparatus having adjustable forward-faced and rearward-faced configurations of use, and its operating method.

2. Description of the Related Art

An infant stroller can be typically used for transporting an infant in a convenient manner. Because the adult pushes the infant stroller from the rear side, the child seated in the infant stroller generally cannot see the adult. This may be disadvantageous as the sight of a familiar face may comfort the child. To overcome this issue, certain manufacturers have developed infant strollers provided with a backrest that can be adjustable toward the rear or front of the stroller for either forward-faced or rearward-faced seating configurations of use. More specifically, when the backrest is inclined forward, the child can be seated facing the rear of the stroller. When the backrest is inclined rearward, the child can be seated facing the front of the stroller. Because this approach requires a seat of a larger size, the adult may erroneously place the child on the front or rear portion of the seat while the stroller is not configured to the adequate orientation. For example, the adult may have the child seat on the rear portion of the seat while the stroller is in the forward-faced seating configuration of use, or reciprocally. Such misuse may affect the safety of the stroller.

Therefore, there is a need for an improved design that is convenient to operate and can address at least the foregoing safety issues.

SUMMARY

The present application describes a child carrier apparatus adjustable to forward-faced and rearward-faced seating configurations of use, and its operating method. The apparatus and method described herein can prevent erroneous use of the front or rear seat, and is safer in use.

In one embodiment, the child carrier apparatus comprises a support frame, a backrest assembly having a backrest frame, a seat assembly mounted with the support frame, wherein the seat assembly includes a first seat frame and a second seat frame, the second seat frame being operable to rotate about a pivot axle relative to the first seat frame, and a hinge structure connected between the backrest frame and the first seat frame. The hinge structure blocks rotation of the backrest frame when the second seat frame is deployed for use, and access to the second seat frame is disabled when the child carrier apparatus is in a configuration using the first seat frame for seating a child.

The present application also describes a method of operating a child carrier apparatus. The child carrier apparatus has a forward-faced and rearward-faced seating configuration of use, and can include a backrest frame, first and second seat frames, and a hinge structure, wherein the hinge structure includes a seat coupling element affixed with the first seat frame, a backrest coupling element affixed with the backrest frame and pivotally connected with the seat coupling element about a pivot axis, a motion transmission unit assembled with the second seat frame, and a latch element mounted for slidable movement between the seat coupling element and the backrest coupling element. The method comprises rotating the second seat frame in a first direction to cause the latch element to move from a first position where the latch element engages with the seat coupling element and the backrest coupling element, to a second position where the latch element disengages from the seat coupling element, and rotating the backrest frame from a first inclination to a second inclination.

At least one advantage of the structures and methods described herein is the ability to provide a child carrier apparatus that can totally disable one seating configuration of use (e.g., the rearward-faced seating configuration) when it is adjusted to another one (e.g., forward-faced seating configuration). Accordingly, erroneous use can be prevented, and the child carrier apparatus can be safer in use.

BRIEF DESCRIPTION OF THE DRAWINGS

FIG. 7A is a schematic view illustrating the hinge structure in an unlocked state;

DETAILED DESCRIPTION OF THE EMBODIMENTS

The present application describes a child carrier apparatus adjustable to forward-faced and rearward-faced seating configurations of use, and its operating method. The apparatus and method described herein can prevent erroneous use of the front or rear seat, and is safer in use. The features described herein can be applied to any types of child carrier apparatus including, without limitation, stroller apparatuses, child seats, and the like.

Figure 1:
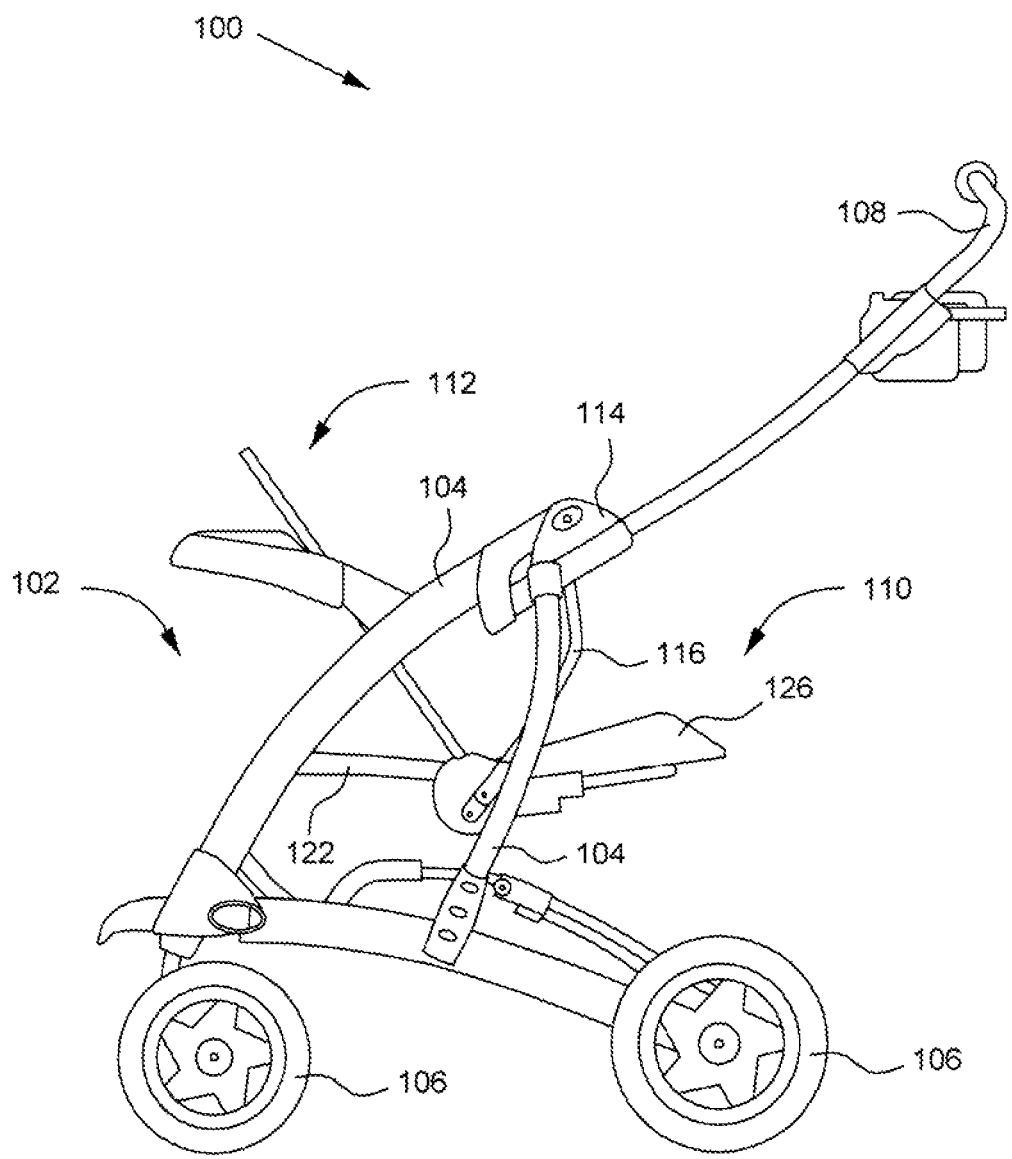
FIG. 1 is a schematic view illustrating an embodiment of a child carrier apparatus.

FIG. 1 is a schematic view illustrating a stroller embodiment of a child carrier apparatus 100. The child carrier apparatus 100 can include a support frame 102 having a plurality of support legs 104 on left and right sides, a plurality of wheels 106, a U-shaped handle 108, a seat assembly 110 and a backrest assembly 112. According to one embodiment, the support legs 104 can be respectively formed by the assembly of retractable tubes, and connected with left and right sides of the handle 108 via hinges 114, whereby the support frame 102 can be collapsible for convenient storage. Hang rod elements 116 are provided for connecting left and right sides of the seat assembly 110 with the hinges 114. In one embodiment, each of the hinges 114 can include a latching device (not shown) that is incorporated in each of the hinges 114 and is coupled via a cable or the like with a release button (not shown) provided on the handle 108. When the release button is operated, the latching device can unlock to allow rotation of the handle 108, which can be then pushed to cause the support legs 104 and hang rod elements 116 to fold downward for collapsing the support frame 102 into a compact form.

Figure 2:
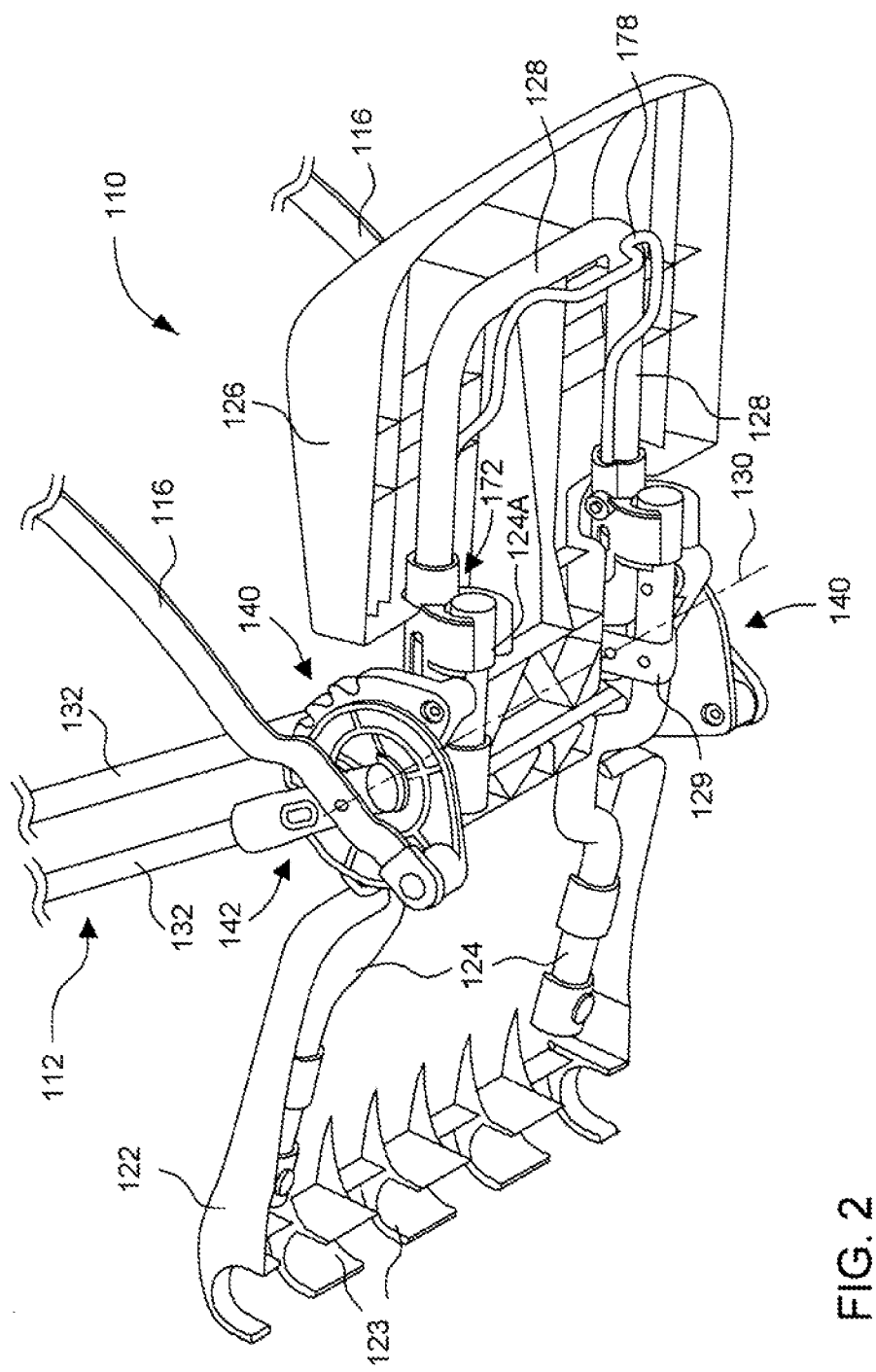
FIG. 2 is a schematic view illustrating the construction of a seat assembly and backrest assembly in the child carrier apparatus shown in FIG. 1.

FIG. 2 is a schematic view illustrating the construction of the seat assembly 110 and the backrest assembly 112. The seat assembly 110 can include a first seat member (for example front seat 122), a first seat frame (for example front seat frame 124) affixed with an underside of the front seat 122, a second seat member (for example rear seat 126), and a second seat frame (for example rear seat frame 128) affixed with an underside of the rear seat 126. An upper surface of the front seat 122 may be slightly inclined to provide comfortable seating. A front edge of the front seat 122 can be provided with a fastening element 123 through which the front of the seat assembly 110 can be secured with a transverse bar (not shown) of the support frame 102.

The rear seat frame 128 can be formed from a tubular assembly having a generally U-shape, which can be adapted to provide support for the rear seat 126. The front seat frame 124 can have a rear end provided with a bracket element 129. Rivets, pins or like fasteners may be respectively engaged through the bracket elements 129 to define a pivot axis 130 about which the rear seat frame 128 is pivotally coupled with the bracket element 129. The rear seat frame 128 can thereby pivoted relative to the front seat frame 124 about the pivot axis 130.

The backrest assembly 112 can include a generally U-shaped backrest frame 132 that can provide support for mounting a backrest board (not shown). On each of the left and right sides of the seat assembly 110, the backrest frame 132 can be pivotally connected with the front seat 122 via a hinge structure 140 assembled coaxial to the pivot axis 130. Accordingly, the backrest frame 132 can adjustably rotate about the pivot axis 130 to switch to a forward or rearward configuration of use. Moreover, the backrest frame 132 can also include a backrest adjustment mechanism 142 arranged adjacent to each of the hinge structures 140, through which the inclined position of the backrest assembly 112 can be securely held relative to the seat assembly 110.

Figure 3:
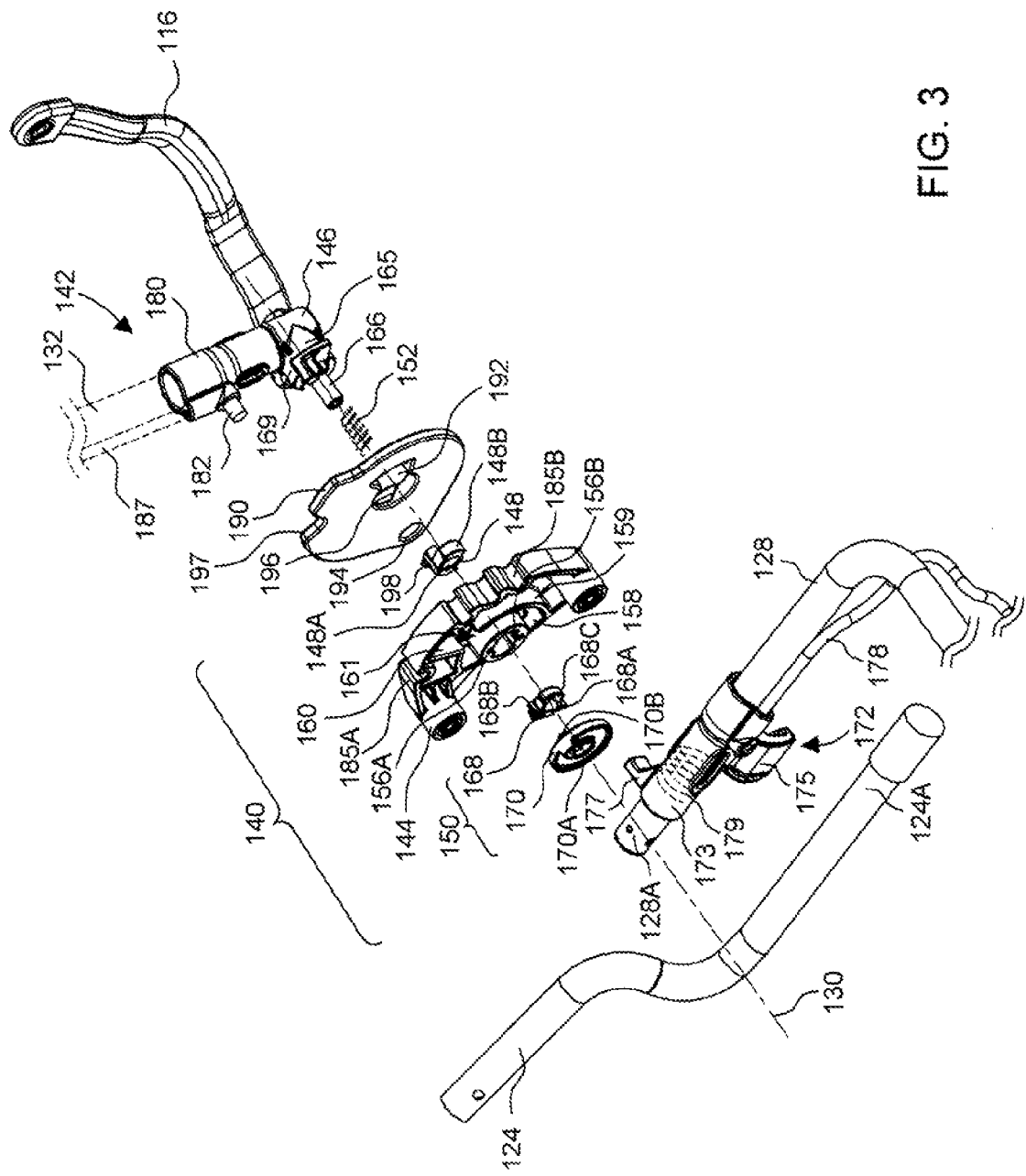
FIG. 3 is an exploded view illustrating the construction of a hinge structure and backrest adjustment mechanism.

FIG. 3 is an exploded view illustrating the hinge structure 140 and backrest adjustment mechanism 142 at one side of the support frame 102. The hinge structure 140 can include a seat coupling element 144, a backrest coupling element 146, a latch element 148, a motion transmission unit 150 and a spring 152. The seat coupling element 144 is placed between the backrest frame 132 and the rear seat frame 128, and is secured with the front seat frame 124. The backrest coupling element 146 is secured with a side distal end of the backrest frame 132, and is pivotally connected with the seat coupling element 144. Accordingly, rotation of the backrest frame 132 can also drive the backrest coupling element 146 to rotate synchronously about the pivot axis 130.

The latch element 148 can be slidably assembled between the seat coupling element 144 and the backrest coupling element 146. During operation, rotation of the rear seat frame 128 can cause the motion transmission unit 150 to axially displace the latch element 148 along the pivot axis 130 between a first and second position for either locking the seat coupling element 144 with the backrest coupling element 146, or unlocking these elements to permit relative rotation.

Figure 4:
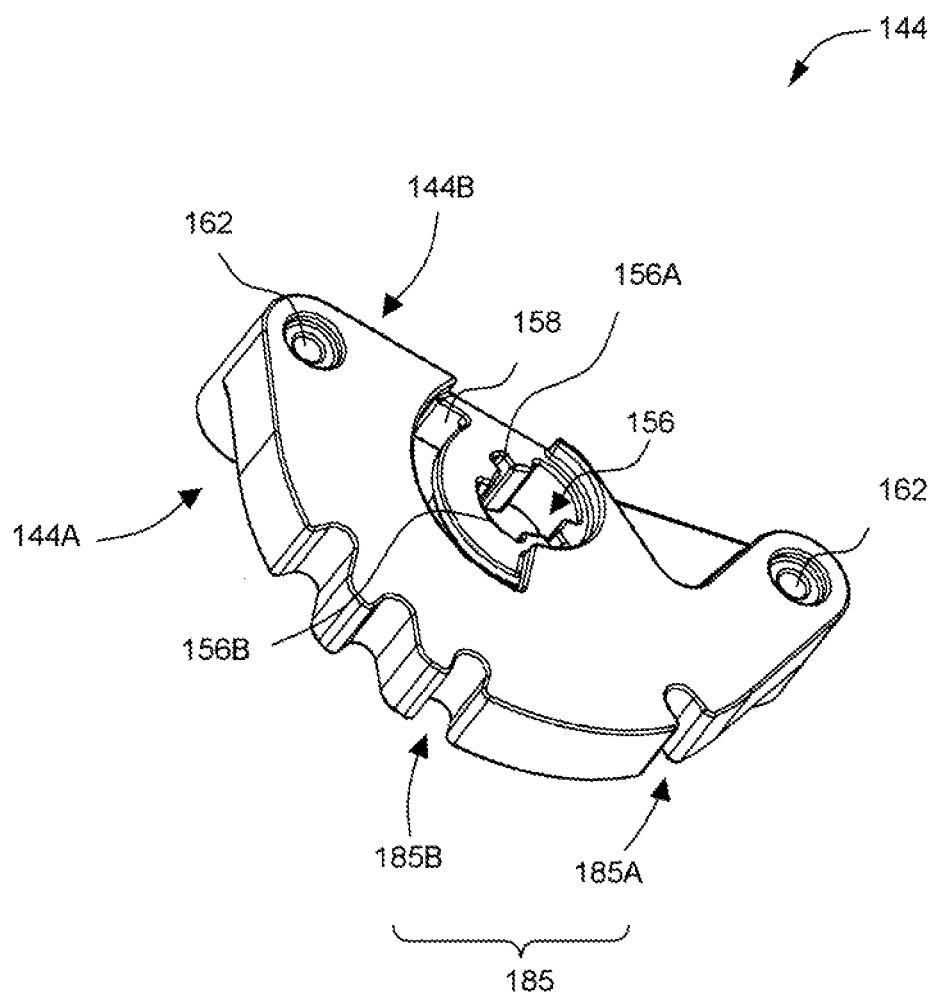
FIG. 4 is a schematic view illustrating a seat coupling element used in the hinge structure.

In conjunction with FIG. 3, FIG. 4 is a schematic view of the seat coupling element 144. The seat coupling element 144 can be formed as a plate having an axle hole 156, and a curved guide slot 158 eccentric from and having a curvature centered on the axle hole 156. The axle hole 156 and guide slot 158 can be cut through the seat coupling element 144 from a first side 144A to an opposite second side 144B thereof. An inner surface of the axle hole 156 can include multiple grooves 156A and 156B.

As shown in FIG. 3, the first side 144A of the seat coupling element 144 can include a sidewall 159. The sidewall 159 can have a generally curved contour that can delimit at least partially a rim portion of the guide slot 158 on the first side 144A. An opening 161 communicating with the guide slot 158 is defined between a distal end of the sidewall 159 and another sidewall 160.

Moreover, a peripheral edge of the seat coupling element 144 can a plurality of locking grooves 185, which may include a forward locking groove 185A and a rearward locking groove 185B. The seat coupling element 144 can also include two threaded holes 162 provided at two approximately opposite locations relative to the axle hole 156, through which screws or like fasteners may be engaged to affix the seat coupling element 144 with the front seat frame 124.

Figure 5A:
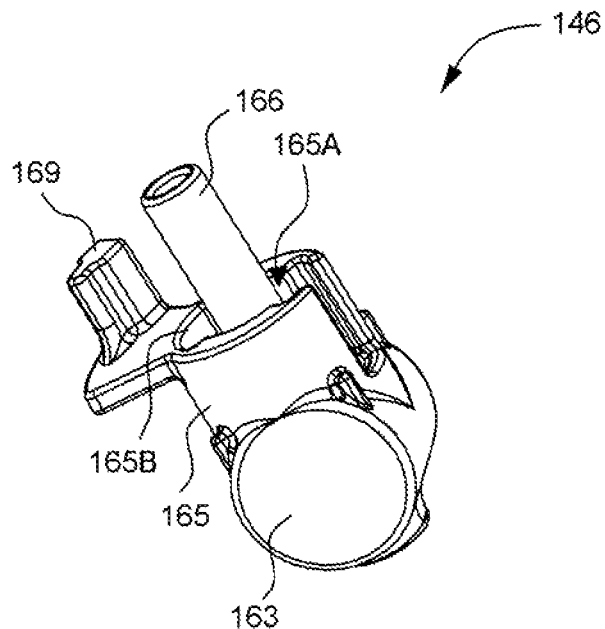
FIGS. 5A and 5B are schematic views illustrating a backrest coupling element of the hinge structure under different angles.
Figure 5B:
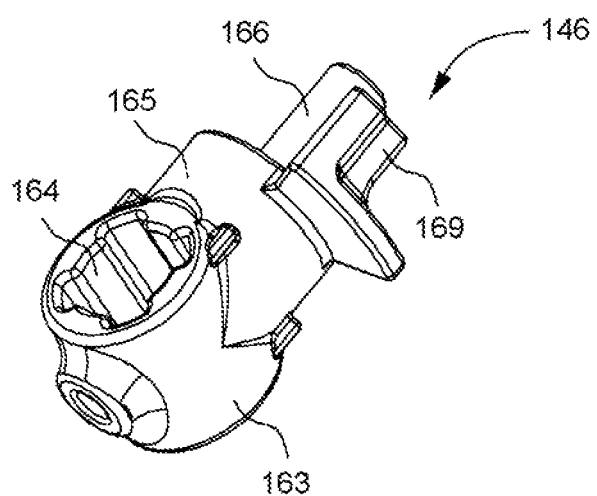

In conjunction with FIG. 3, FIGS. 5A and 5B are schematic views illustrating the backrest coupling element 146 under different angles. The backrest coupling element 146 can include a housing 163. A side of the housing 163 can include a cavity 164 through which the backrest frame 132 can be mounted with the backrest coupling element 146.

The housing 163 can also include an extension 165 lying approximately perpendicular to a side of the cavity 164. The extension 165 can include an inner gap 165A in which is formed a hollow shaft portion 166 projecting outward. In addition, the extension 165 can include a flange 169 placed eccentric from the shaft portion 166. A curved inner surface of the inner gap 165A may form a radial recessed groove 165B located approximately on the same side as the flange 169 relative to the shaft portion 166.

Figure 6A:
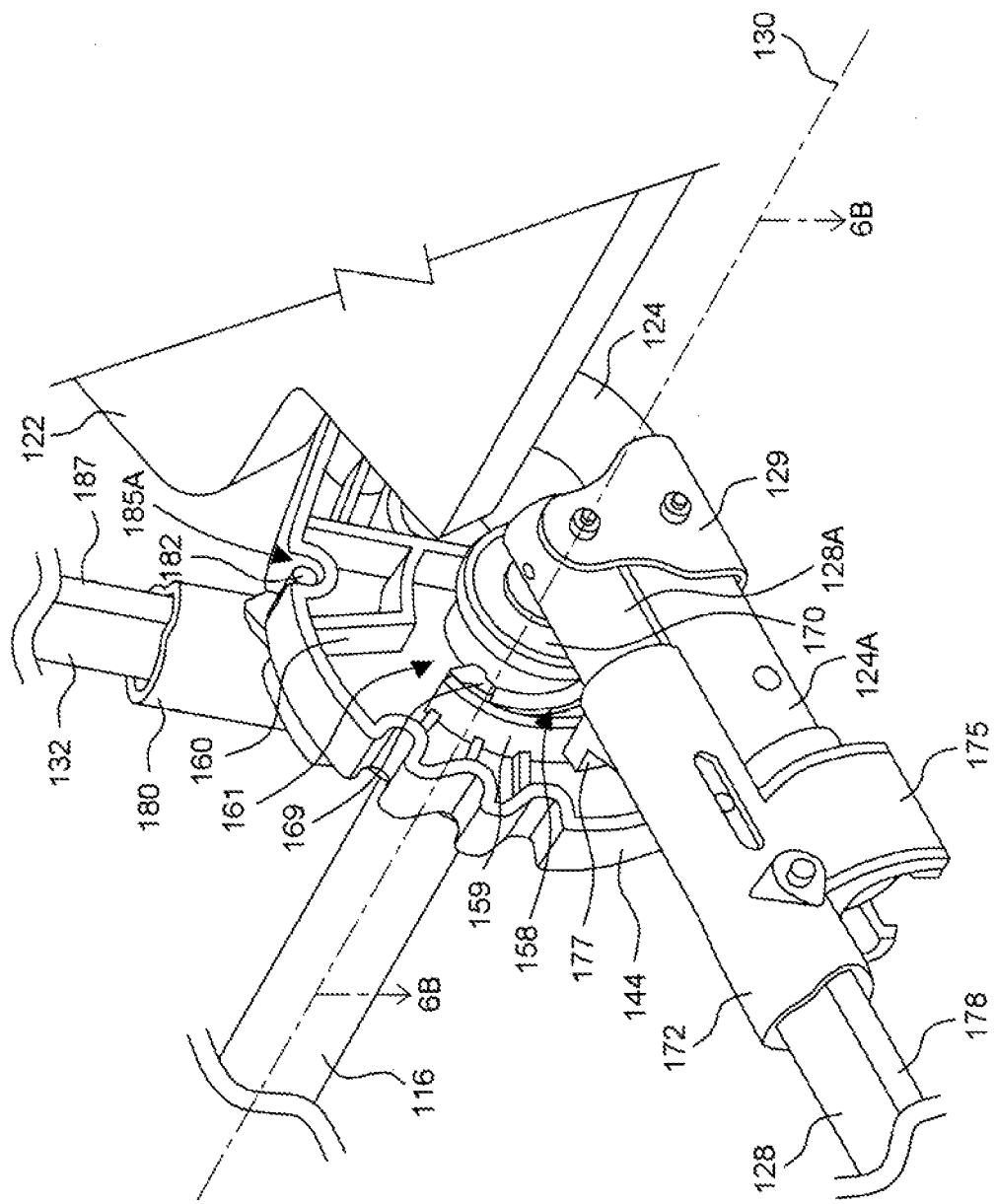
FIG. 6A is a schematic view illustrating the hinge structure in a locked state.
Figure 6B:
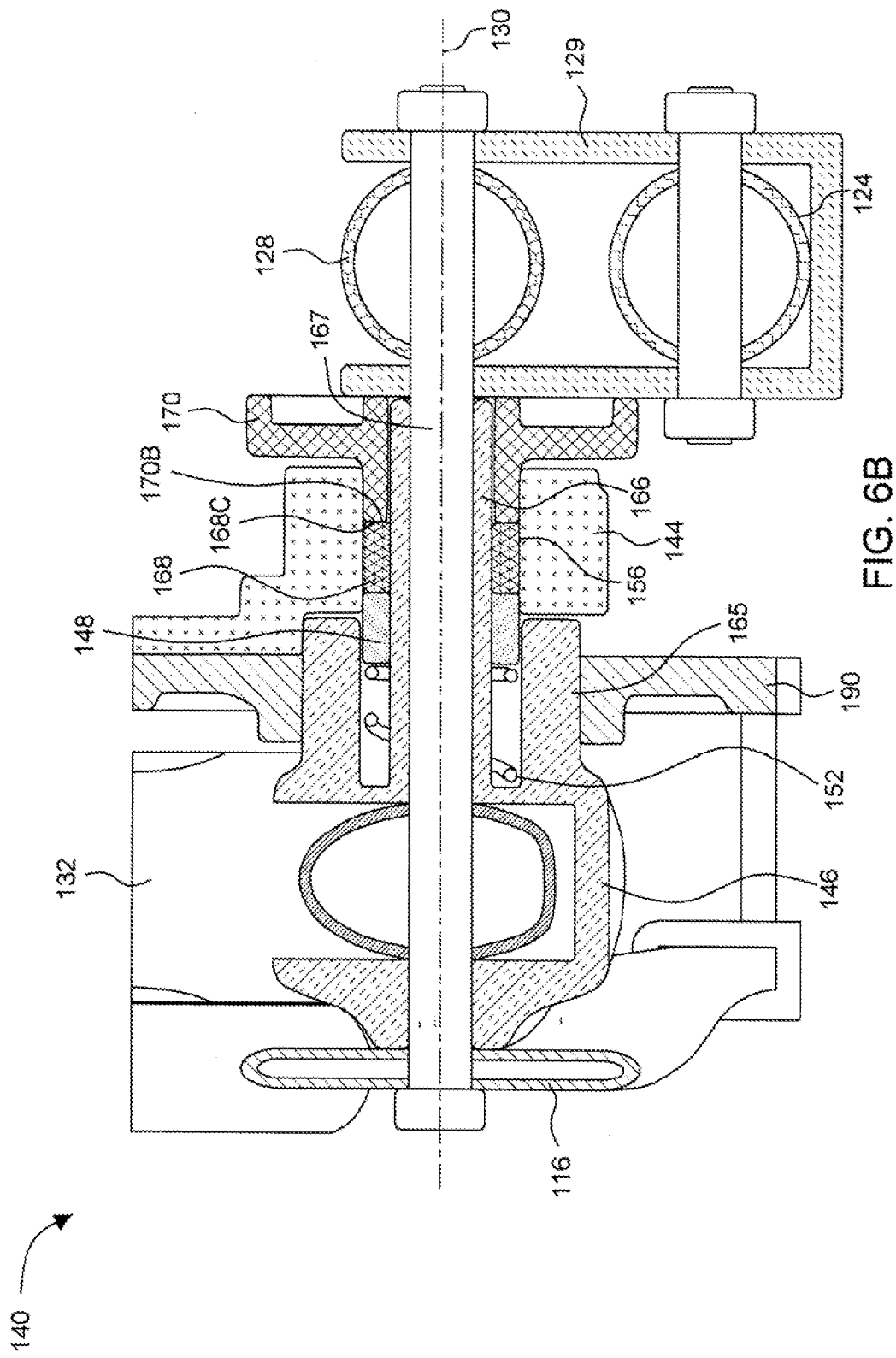
FIG. 6B is a schematic cross-sectional view of the hinge structure taken along section line 6B in FIG. 6A.

The shaft portion 166 can be pivotally connected with the bracket 129 about the pivot axis 130 via engagement of a rivet, screw, bolt or like pivot link 167 (better shown in FIG. 6B). The latch element 148 is assembled for translational movement along the shaft portion 166, whereas the spring 152 can wrapped around the shaft portion 166 and placed in the inner gap 165A. When the seat coupling element 144 and the backrest coupling element 146 are assembled together, the flange 169 can be lodged through the guide slot 158, the shaft portion 166 passes through the motion transmission unit 150 and pivotally connects through the axle hole 156, and the spring 152 is located in the inner gap 165A interposed between the latch element 148 and a sidewall (not shown) of the inner gap 165A.

Figure 8:
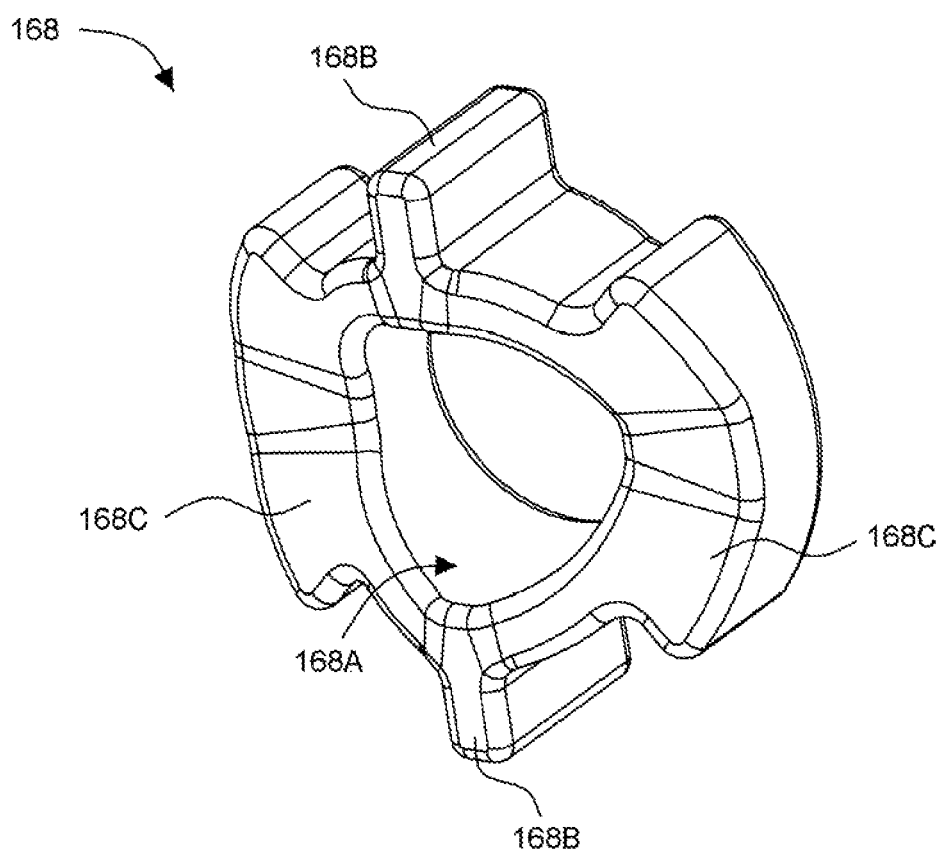
FIGS. 8 and 9 are schematic views respectively illustrating a slider element and push element used to form a motion transmission unit in the hinge structure.
Figure 9:
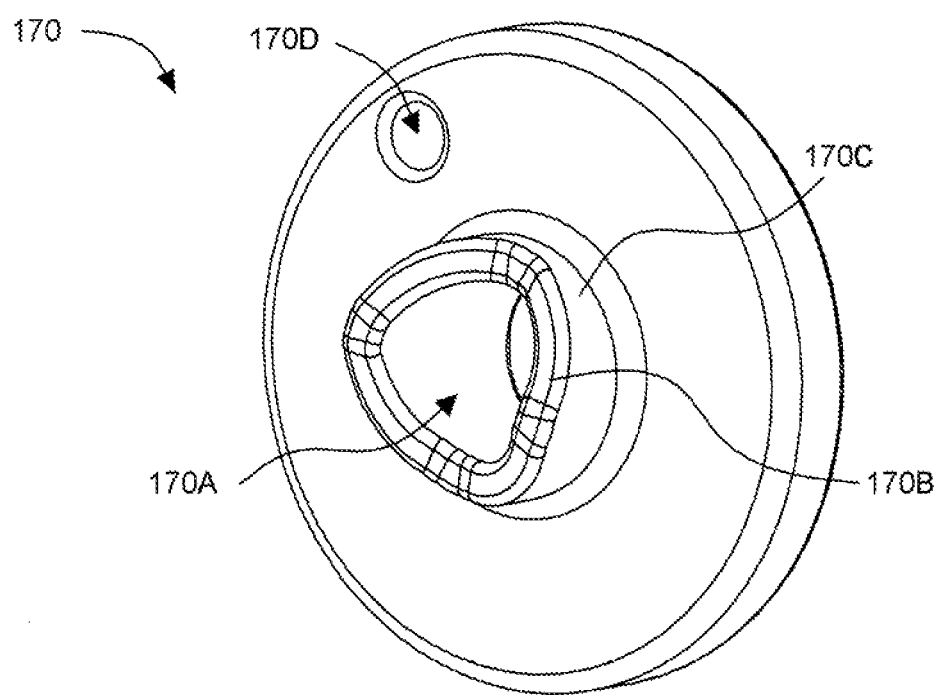

Referring to FIG. 3 again, the motion transmission unit 150 can include a slider element 168 and a push element 170. FIGS. 8 and 9 are schematic views respectively illustrating the slider element 168 and push element 170. The slider element 168 and push element 170 can respectively have corresponding axle holes 168A and 170A through which the shaft portion 166 can be assembled. As the backrest frame 132 is rotated, the shaft portion 166 can be driven in rotation relative to the slider element 168 and push element 170. The slider element 168 is assembled to perform translational movements along the shaft portion 166 and in the axle hole 156. An outer peripheral edge of the slider element 168 can include a plurality of radial ribs 168B projecting outward. A side of the slider element 168 facing the push element 170 can also include a beveled surface 168C, whereas another side of the slider element 168 opposite to the beveled surface 168C can be in contact with the latch element 148. The ribs 168B can engage with corresponding grooves 156A provided on the inner surface of the axle hole 156 to block rotation of the slider element 168 relative to the seat coupling element 144.

The push element 170 can be formed as a generally circular plate affixed with a side distal end portion 128A of the rear seat frame 128. As shown in FIG. 9, a side of the push element 170 facing the slider element 168 can include a raised portion 170C that is provided with an axle hole 170A and has a distal end surface forming a beveled surface 170B. When assembled, screws can be engaged through the threaded holes 170D to affix the push element 170 with the side distal end portion 128A of the rear seat frame 128, such that the beveled surface 170B is located in the axle hole 156 and is in contact with the beveled surface 168C of the slider element 168.

Figure 10:
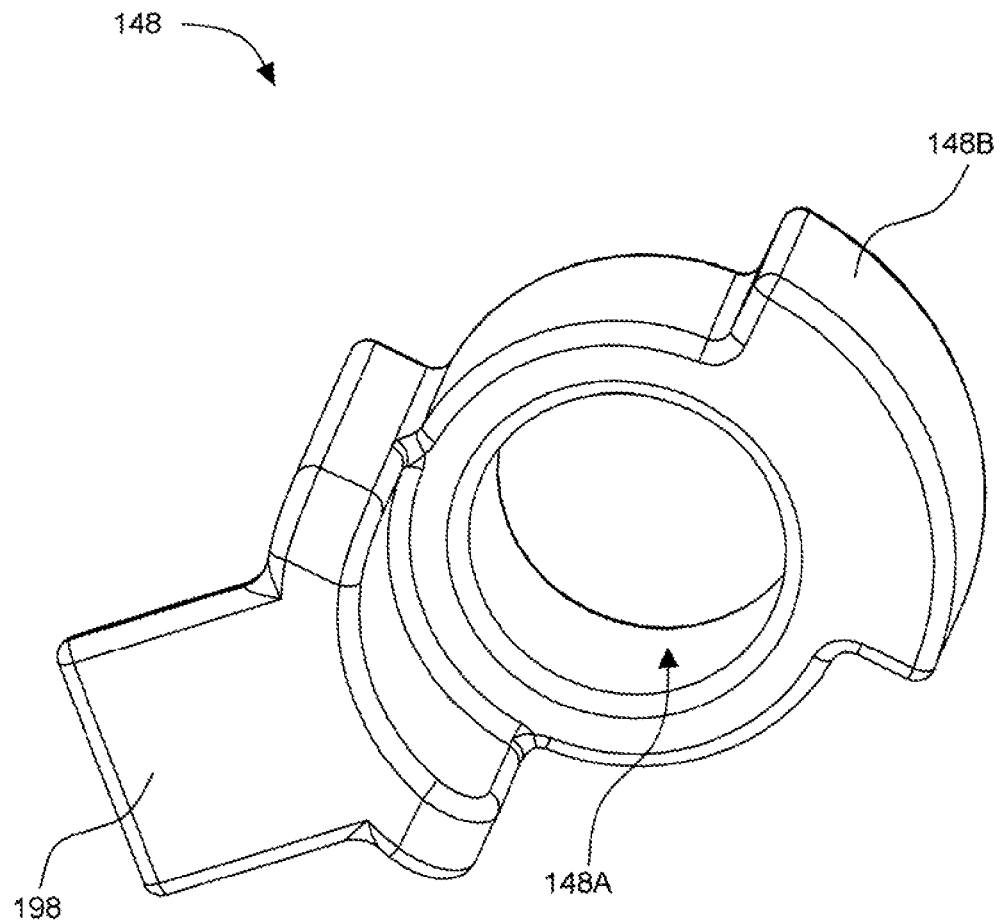
FIG. 10 is a schematic view illustrating a latch element used in the hinge structure.

In conjunction with FIG. 3, FIG. 10 is a schematic view illustrating the latch element 148. The latch element 148 can have a generally circular shape, including an axle hole 148A through which the shaft portion 166 can be passed for movably assembling the latch element 148 between the slider element 168 and the spring 152. An outer peripheral edge of the latch element 148 can include a radial rib 148B projecting outward, and a flange 198 also projecting outward at a position diametrically opposite the radial rib 148. The sliding movement of the latch element 148 can cause the rib 148B to respectively engage with a groove 156B formed on the inner surface of the axle hole 156 and the groove 165B formed on the inner surface of the inner gap 165A in the extension 165. Under either of the biasing action applied from the spring 152 and action applied from the motion transmission unit 150, the latch element 148 can slide toward either the side of the seat coupling element 144, or the side of the backrest coupling element 146. More specifically, the latch element 148 can move toward the seat coupling element 144 to cause the rib 148B to engage with the grooves 165B and 156B, and toward the backrest coupling element 146 to have the rib 148B disengaged from the groove 156B and withdrawn in the groove 165B.

While the motion transmission unit 150 has been described as being formed from the assembly of the slider element 168 and push element 170, other constructions are possible. For example, the beveled surface 168C of the slider element 168 can be integrally formed on the latch element 148, which can accordingly be in direct contact with the beveled surface 170B of the push element 170 without the need of a separate slider element.

Referring again to FIGS. 2 and 3, the side distal end portion 128A of the rear seat frame 128 can further include a seat lock 172. The seat lock 172 can comprise a sleeve 173, a grasp portion 175 extending downward from the sleeve 173, a rib 177 extending from the sleeve 173 toward a first side 144A of the seat coupling element 144, and a pull handle 178 affixed with a rear side of the sleeve 173.

The sleeve 173 can be movably assembled with the side distal end portion 128A of the rear seat frame 128, and include a spring 179 mounted therein. When the seat assembly 110 and backrest assembly 112 are in a rearward-faced seating configuration of use, the spring 179 can bias the seat lock 172 toward the front, such that the rib 177 can abut against the sidewall 159 of the seat coupling element 144, and the rear end 124A of the front seat frame 124 can engage with the grasp portion 175. As the rear seat frame 128 is pivoted upward, the rear end 124A of the front seat frame 124 can disengage from the grasp portion 175, the spring 179 can act to bias the rib 177 into contact with the sidewall 159, and the rib 177 can consequently slide along the sidewall 159 until it reaches the opening 161 and then travel into the guide slot 158.

Once the rib 177 is engaged in the guide slot 158, the connection between the seat lock 172 and the seat coupling element 144 can restrain the movement of the rear seat frame 128. In particular, since the flange 169 of the backrest coupling element 146 is also engaged in the guide slot 158, the flange 169 can be in support contact with the rib 177 to sustain the total weight load of the rear seat frame 128, the seat lock 172 and related parts that would tend to incline rearward the rear seat frame 128. Accordingly, the rear seat frame 128 can be prevented from freely rotating downward.

Referring again to FIG. 3, the backrest adjustment mechanism 142 can include a latch 180 assembled with a side segment of the backrest frame 132 at a position proximate to the backrest coupling element 146. According to one embodiment, the latch 180 can be formed as a generally cylindrical sleeve that is movably assembled with the side segment of the backrest frame 132 and has a stud 182 protruding at one side toward the seat coupling element 144. A spring (not shown) disposed in the latch 180 can bias the latch 180 in movement along the side segment of the backrest frame 132 to engage the stud 182 with one of the locking grooves 185 (which may include the forward locking groove 185A and rearward locking groove 185B) on the seat coupling element 144. Moreover, the latch 180 is also affixed with a cable 187. The cable 187 can be pulled to overcome the spring action applied on the latch 180 and disengage the stud 182 from the locking groove 185, thereby permitting pivotal adjustment of the backrest frame 132.

Figure 7B:
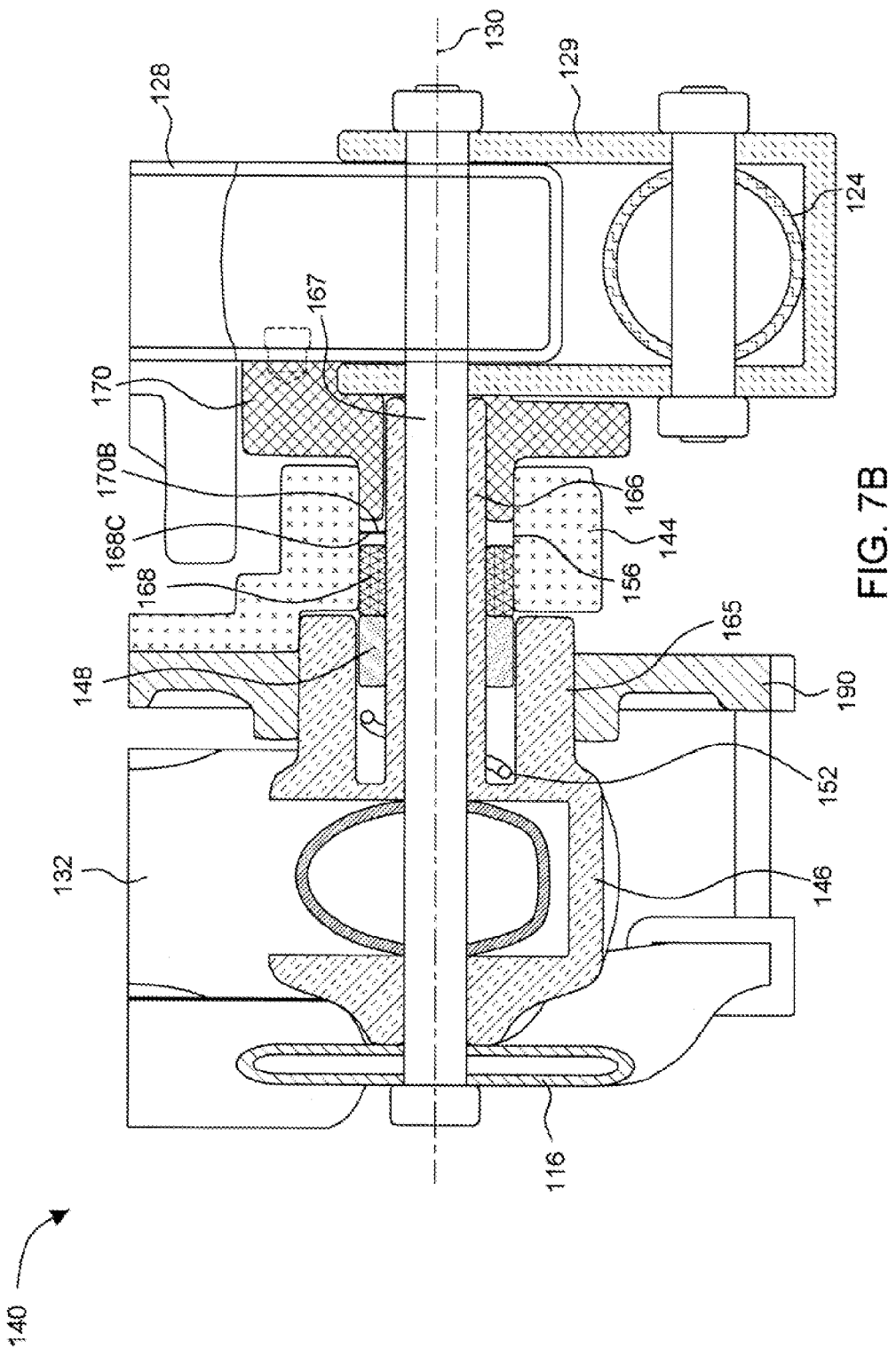
FIG. 7B is a schematic cross-sectional view of the hinge structure taken along section line 7B in FIG. 7A.

Exemplary operation of the hinge structure 140 is described hereafter with reference to FIGS. 3, 6A, 6B, 7A and 7B. Among these drawings, FIG. 6A schematically shows the hinge structure 140 in a locked state, whereas FIG. 6B is a schematic cross-sectional view of the hinge structure 140 taken along section line 6B in FIG. 6A. FIG. 7A schematically shows the hinge structure 140 in an unlocked state, whereas FIG. 7B is a schematic cross-sectional view of the hinge structure 140 taken along section line 7B in FIG. 7A. For clarity, only the hinge structure 140 and certain parts connected thereto are illustrated in FIGS. 6A, 6B, 7A and 7B.

In FIGS. 6A and 6B, the shown locked state is associated with a rearward-faced seating configuration of use of the seat assembly 110 and backrest assembly 112. The rear seat frame 128 is deployed close to a horizontal plane. The grasp portion 175 of the seat lock 172 is engaged with the rear end 124A of the front seat frame 124, whereas the spring 179 (better shown in FIG. 3) can bias the rib 177 into contact with the sidewall 159 of the seat coupling element 144. Moreover, the backrest frame 132 is held in a rearward-faced configuration of use (i.e., inclined toward the front of the infant carrier apparatus), with the latch 180 being engaged with the forward locking groove 185A of the seat coupling element 144.

As better shown in FIG. 6B, when the hinge structure 140 is in the locked state, the biasing action from the spring 152 and the interaction between the beveled surfaces 168C and 170B of the slider element 168 and the push element 170 can act to displace the latch element 148 along the shaft portion 166 toward the seat coupling element 144. The latch element 148 can be thereby shifted to a first position where the rib 148B can engage with the grooves 165B and 156B. In this manner, the backrest coupling element 146 and the seat coupling element 144 can be locked with each other, blocking rotation of the backrest coupling element 146 and backrest frame 132 relative to the seat coupling element 144. Accordingly, when the hinge structure 140 is in the locked state and the rear seat frame 128 is positioned in the rearward-faced seating configuration of use (i.e., the rear seat frame 128 and backrest frame 132 can accommodate a child in a seating position facing rearward), adjustment of the backrest assembly 112 is blocked.

Referring to FIGS. 3, 4, 7A and 7B, when a caregiver wants to switch from the rearward-faced to the forward-faced seating configuration of use, the rear seat frame 128 first has to be rotated upward from its deployed position, such that the rib 177 of the seat lock 172 can slide along the sidewall 159 and travel into the guide slot 158 via the opening 161. The rib 177 then can come into contact with the flange 169 of the backrest coupling element 146 that laterally projects through the guide slot 158. As shown in FIGS. 7A and 7B, while the rear seat frame 128 is rotated upward, the push element 170 is also driven in rotation, and the beveled surface 170B of the push element 170 can push against the beveled surface 168C of the slider element 168 to cause the slider element 168 and the latch element 148 to move along the shaft portion 166 toward the backrest coupling element 146. As a result, the latch element 148 can be shifted to a second position where the rib 148B disengages from the groove 156B and is withdrawn only in the groove 165B. In this manner, the locking engagement between the backrest coupling element 146 and the seat coupling element 144 can be removed (as shown in FIG. 7B). Subsequently, the cable 187 can be pulled to overcome the spring action applied on the latch 180 and drive the latch 180 and stud 182 in movement to disengage from the forward locking groove 185A. The backrest frame 132 then can be pivoted from the forward inclined position to a rearward inclined position. In this configuration, the front seat frame 124 and the backrest frame 132 can be used to accommodate a child in a seated position facing forward. Moreover, the rear seat frame 128 is folded to a position substantially parallel and adjacent to the backrest frame 132, which disables access to the rear seat frame 128 for seating a child. Erroneous use of the rear seat frame 128 can be therefore prevented.

It is worth noting that the rib 177 and the flange 169, kept in contact with each other owing to the weight load of the rear seat frame 128, can be guided to move in unison along the guide slot 158 as the backrest frame 132 is adjusted rearward to set the forward-faced seating configuration of use. Accordingly, the rear seat frame 128 can also rotate downward along with the backrest frame 132, which may cause the latch element 148 to slightly move along the shaft portion 166 toward the seat coupling element 144 owing to the biasing action from the spring 152. However, because the slight movement of the latch element 148 does not reach the engagement position of the groove 156B, the hinge structure 140 is prevented from switching to the locked state during rearward adjustment of the backrest frame 132.

In case the infant carrier apparatus is to be switched from the forward-faced to the rearward-faced seating configuration of use, the backrest frame 132 first has to be inclined forward. Owing to the contact between the flange 169 and the rib 177, the rear seat frame 128 and the seat lock 172 can be driven in rotation, and the rib 177 can be guided to slide along the guide slot 158 until it reaches the opening 161, as shown in FIG. 7A. Then the pull handle 178 can be operated to cause the seat lock 172 to move along the rear seat frame 128, which causes the rib 177 to travel in a radial direction relative to the pivot axis 130, pass through the opening 161 and disengage from the guide slot 158. The rear seat frame 128 then can be pivoted downward about the pivot axis 130 until it reaches the deployed position suitable for the rearward-faced seating configuration of use. While the rear seat frame 128 is rotated downward, the biasing action from the spring 152 and the interaction between the beveled surfaces 168C and 170B of the slider element 168 and push element 170 can drive the latch element 148 to slide along the shaft portion 166 toward the seat coupling element 144. As a result, the rib 148B of the latch element 148 can engage with the grooves 165B and 156B (as shown in FIG. 6B) and the backrest coupling element 146 and the seat coupling element 144 can be locked with each other, blocking rotation of the backrest coupling element 146 relative to the seat coupling element 144.

As described previously, in case the caregiver wants to switch from the rearward-faced to the forward-faced seating configuration of use, the rear seat frame 128 first has to be rotated upward from the deployed position to disable its access and remove the locking engagement that blocks rotation of the backrest frame 132. Only then the backrest frame 132 can be inclined rearward to properly set the forward-faced seating configuration of use. Because the rearward-faced seating configuration has to be completely removed to correctly set the forward-faced seating configuration of use, erroneous use of the rear seat occurring while the infant carrier apparatus is still set in the forward-faced seating configuration can be prevented in an effective manner, making the infant carrier apparatus safer in use.

While the aforementioned embodiment operates the rear seat frame 128 to lock and unlock the backrest frame 132, it will be appreciated that the functional features of the front seat frame 124 and rear seat frame 128 can be interchanged. For example, the same advantages and features may be implemented in an alternate embodiment in which the front seat frame 124 can be designed as the pivotal part with the motion transmission unit assembled on the side of the front seat frame 124. In this configuration, the front seat frame can be rotated to lock and unlock the backrest frame in a similar manner as described previously.

Referring again to FIG. 3, when the infant carrier apparatus is not used, the seat assembly 110 and the backrest assembly 112 can be driven in movement via the hang rod elements 116 as the infant carrier apparatus is collapsed into a compact form. To facilitate the folding of the backrest frame 132 when the infant carrier apparatus is being collapsed, a lock disengagement element 190 can be provided. The lock disengagement element 190 is operable to automatically remove the locked state of the hinge structure 140 during collapse of the child carrier apparatus.

Figure 11:
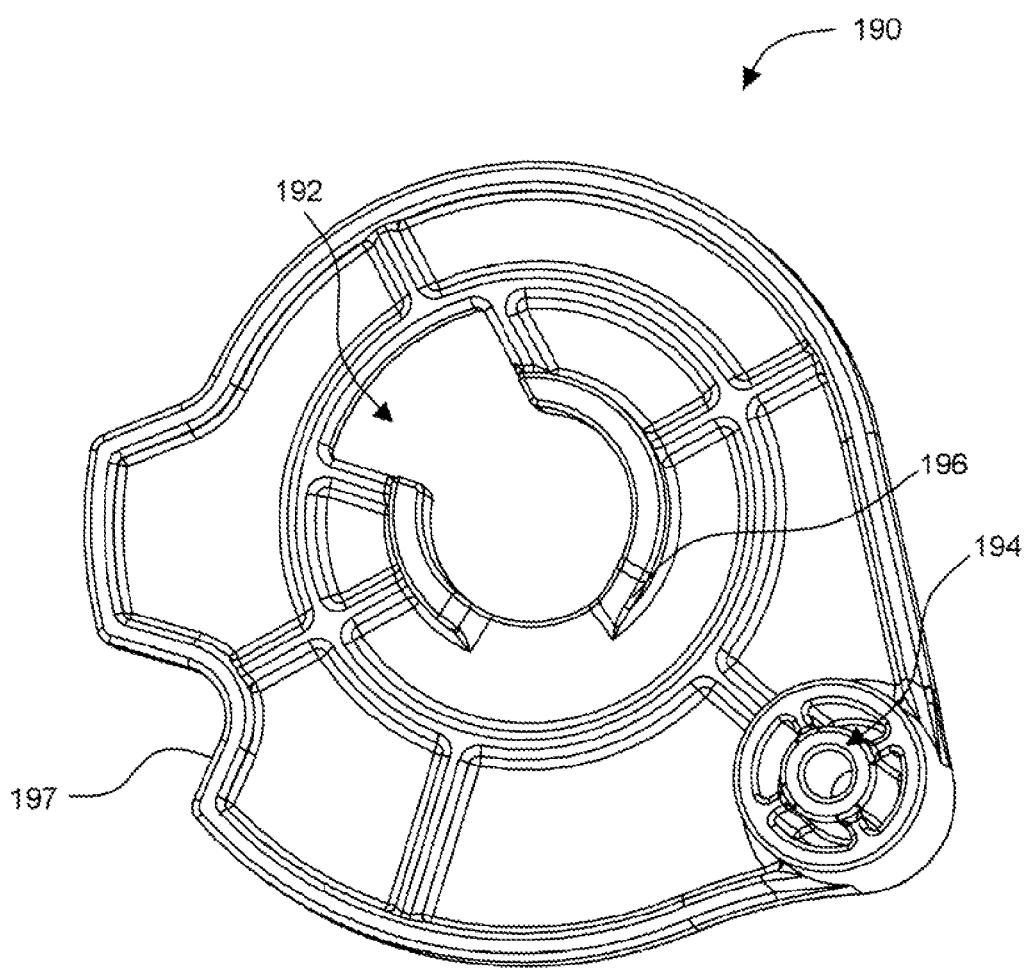
FIG. 11 is a schematic view illustrating a lock disengagement element.

In conjunction with FIG. 3, FIG. 11 is a schematic view illustrating the lock disengagement element 190. The lock disengagement element 190 can be disposed between the backrest frame 132 and the seat coupling element 144. In one embodiment, the lock disengagement element 190 can be formed as a plate having a hole 192 and a threaded hole 194. An outer peripheral edge of the lock disengagement element 190 can also include a beveled surface 197. The lock disengagement element 190 can be affixed with a distal end of the hang rod element 116 via a screw engaging the threaded hole 194. The extension 165, the shaft portion 166 and the flange 169 of the backrest coupling element 146 can be respectively disposed through the hole 192. Moreover, the lock disengagement element 190 can include a beveled surface 196 that is formed on a side facing the backrest coupling element 146 proximate to the hole 192. The beveled surface 196 can be in contact with a flange 198 protruding from the latch element 148.

In case the infant carrier apparatus is collapsed while the hinge structure 140 is in the rearward-faced seating configuration of use as shown in FIGS. 6A and 6B, the hang rod element 116 can rotate and drive the seat assembly 110 in movement. As a result, the lock disengagement element 190 is driven in rotation by the hang rod element 116 to displace the stud 182 of the latch 180 from an initial position in engaging contact with the beveled surface 197 to another position disengaged from the locking groove 185, and also cause the beveled surface 196 to push against the flange 198 of the latch element 148. Accordingly, the latch element 148 can be urged to slide along the shaft portion 166 toward the backrest coupling element 146. The latch element 148 is thereby shifted to the second position where the rib 148B disengages from the groove 156B and is lodged only in the groove 165B. In this manner, the locking engagement between the backrest coupling element 146 and the seat coupling element 144 can be removed. Subsequently, the backrest frame 132 can be driven in rotation by the folding action of the support frame to a collapsed position.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A child carrier apparatus comprising:
a support frame;
a backrest assembly having a backrest frame;
a seat assembly mounted with the support frame, wherein the seat assembly includes a first seat frame and a second seat frame, the second seat frame being operable to rotate about a pivot axis relative to the first seat frame between a deployed state for allowing sitting on the second seat frame, and a folded state disabling sitting on the second seat frame; and
a hinge structure connected between the backrest frame and the first seat frame and including a latch element;
wherein the latch element is operable to lock the backrest frame in a first position when the second seat frame is in the deployed state, and a rotation of the second seat frame from the deployed state to the folded state drives the latch element in movement to unlock the backrest frame such that the backrest frame is allowed to rotate from the first position to a second position; and
wherein the second position of the backrest frame allows sitting on the first seat frame and creates a blocking interference that keeps the second seat frame in the folded state.

2. A child carrier apparatus comprising:
a support frame;
a backrest assembly having a backrest frame;
a seat assembly mounted with the support frame, wherein the seat assembly includes a first seat frame and a second seat frame, the second seat frame being operable to rotate about a pivot axis relative to the first seat frame; and
a hinge structure connected between the backrest frame and the first seat frame, wherein the hinge structure blocks rotation of the backrest frame when the second seat frame is deployed for use, and access to the second seat frame is disabled when the child carrier apparatus is in a configuration using the first seat frame for seating a child, wherein the hinge structure comprises a seat coupling element affixed with the first seat frame, a backrest coupling element affixed with the backrest frame and pivotally connected with the seat coupling element coaxial to the pivot axis, a latch element mounted for slidable movement between the seat coupling element and the backrest coupling element, and a motion transmission unit assembled with the second seat frame,
wherein a rotation of the second seat frame in a first direction is converted to a sliding movement of the latch element from a first position to a second position;
the latch element when in the first position being adapted to engage with the seat coupling element and the backrest coupling element to block rotation of the backrest frame relative to the first seat frame,
the latch element when in the second position being adapted to disengage from the seat coupling element to allow the backrest frame to rotate relative to the first seat frame.

3. The child carrier apparatus according to claim 2, wherein the second seat frame rotates upward in the first direction.

4. The child carrier apparatus according to claim 2, wherein the backrest coupling element includes a shaft portion on which the latch element is movably assembled.

5. The child carrier apparatus according to claim 4, wherein the shaft portion is assembled with the motion transmission unit and a spring, and the latch element is disposed between the motion transmission unit and the spring.

6. The child carrier apparatus according to claim 5, wherein the shaft portion rotates relative to the motion transmission unit when the second seat frame is driven in rotation.

7. The child carrier apparatus according to claim 5, wherein the spring is adapted to bias the latch element from the second position to the first position, when the second seat frame rotates in a second direction opposite to the first direction.

8. The child carrier apparatus according to claim 2, wherein the motion transmission unit comprises a slider element and a push element, the push element being affixed with the second seat frame, and the slider element being disposed between the push element and the latch element.

9. The child carrier apparatus according to claim 8, wherein the slider element includes a first beveled surface, the push element includes a second beveled surface, and the second beveled surface is adapted to push against the first beveled surface to urge the latch element to move from the first position to the second position.

10. The child carrier apparatus according to claim 9, wherein the push element is formed as a plate having a first axle hole and includes a raised portion on a side facing the slider element, a top of the raised portion being provided with the second beveled surface, the slider element having a second axle hole, and the first beveled surface being provided on a side of the slider element facing the raised portion.

11. The child carrier apparatus according to claim 2, wherein the second seat frame further includes a seat lock that is adapted to engage with a distal end of the first seat frame when the child carrier apparatus is in a rearward-faced configuration of use.

12. The child carrier apparatus according to claim 11, wherein the seat coupling element includes a guide slot with which the seat lock is engaged when the second seat frame rotates in the first direction.

13. The child carrier apparatus according to claim 12, wherein the backrest coupling element further includes a flange passing through the guide slot, wherein the seat lock is in contact with the flange after being engaged with the guide slot so that the second seat frame is adapted to rotate along with the backrest frame.

14. The child carrier apparatus according to claim 2, wherein the seat assembly is connected with the support frame via at least a hang rod element, the hang rod element having a lock disengagement element being adapted to contact with the latch element when the hang rod element rotates to collapse the seat assembly, whereby the latch element is urged to move from the first position to the second position.

15. The child carrier apparatus according to claim 2, being configured as a stroller.

16. The child carrier apparatus according to claim 2, wherein the first seat frame is adapted to provide support for a front seat, and the second seat frame is adapted to provide support for a rear seat.

17. The child carrier apparatus according to claim 16, wherein the backrest frame and either of the first and second seat frame are respectively adapted to define a first and second seating space.

18. A method of operating a child carrier apparatus, wherein the child carrier apparatus has a forward-faced and rearward-faced seating configuration of use, and includes a backrest frame, first and second seat frames, and a hinge structure, wherein the hinge structure includes a seat coupling element affixed with the first seat frame, a backrest coupling element affixed with the backrest frame and pivotally connected with the seat coupling element about a pivot axis, a motion transmission unit assembled with the second seat frame, and a latch element mounted for slidable movement between the seat coupling element and the backrest coupling element, the method comprising:

rotating the second seat frame in a first direction to cause the latch element to move from a first position where the latch element engages with the seat coupling element and the backrest coupling element, to a second position where the latch element disengages from the seat coupling element; and rotating the backrest frame from a first inclination to a second inclination.

19. The method according to claim 18, wherein the second seat frame further includes a seat lock, the seat coupling element includes a guide slot, and the seat lock is adapted to engage with the guide slot when the second seat frame rotates in the first direction.

20. The method according to claim 19, further comprising:
rotating the backrest frame and the seat lock from the second inclination to the first inclination;
pulling the seat lock in movement to cause the seat lock to disengage from the guide slot; and
rotating the second seat frame in a second direction opposite to the first direction to cause the latch element to move from the second position to the first position.

* * * * *